March 20, 1945.　　　F. W. SCHWINN　　　2,372,024
FOLDING BICYCLE FRAME
Filed Aug. 14, 1943　　　2 Sheets-Sheet 1
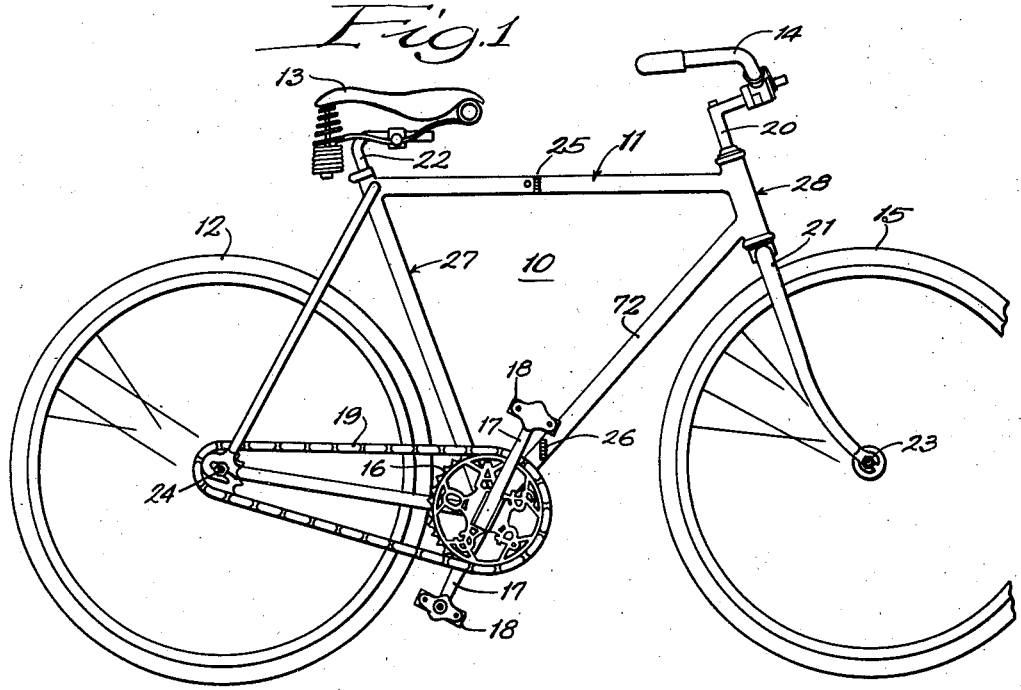
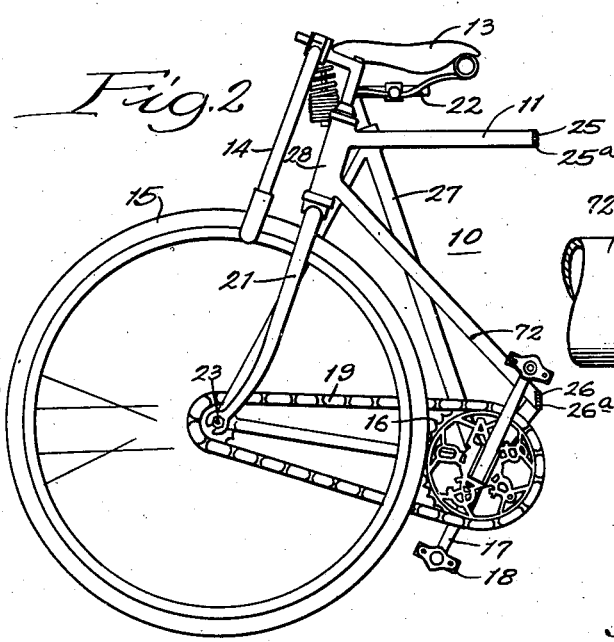
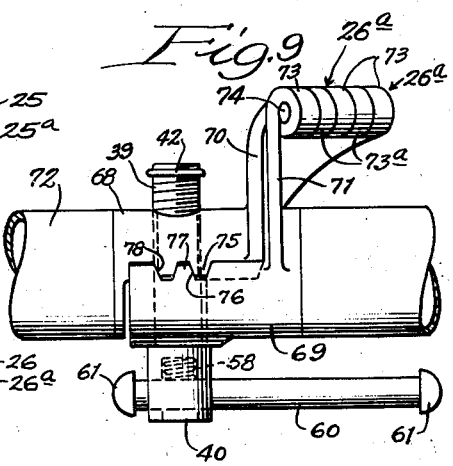
Inventor:
Frank W. Schwinn,
By McCabb, NewBay Dickinson,
Attorneys.

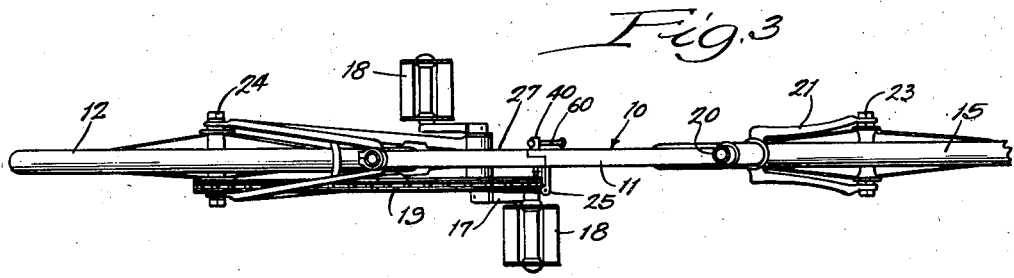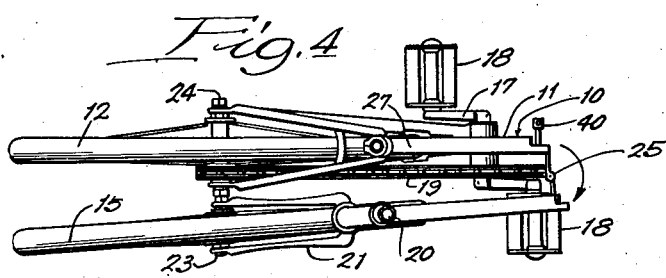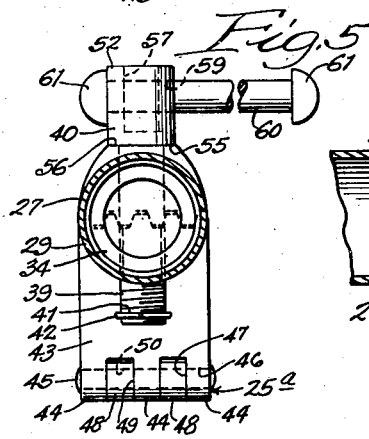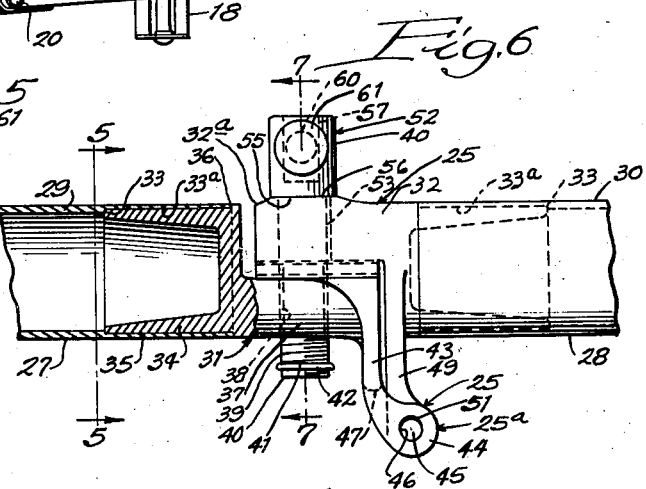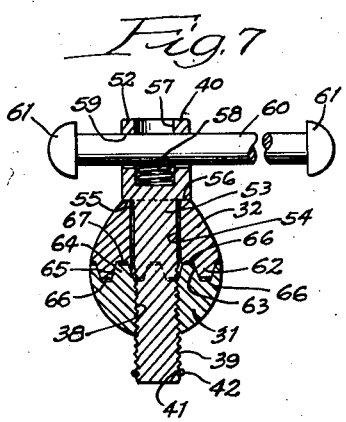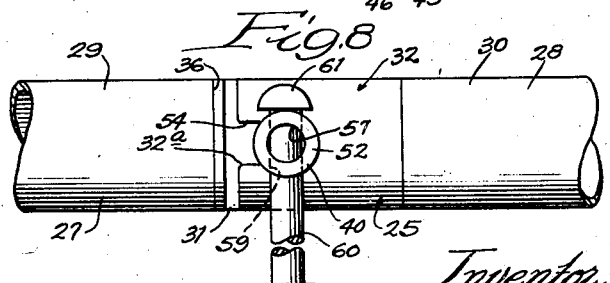

Patented Mar. 20, 1945

2,372,024

UNITED STATES PATENT OFFICE 2,372,024

FOLDING BICYCLE FRAME

Frank W. Schwinn, Chicago, Ill.

Application August 14, 1943, Serial No. 498,686

7 Claims. (Cl. 280—287)

The present invention relates to folding bicycle frames; and while the present folding bicycle frame may be employed with advantage upon any bicycle, it is preferably used in connection with the folding bicycle cranks and folding bicycle handle bars covered by my copending applications, Ser. No. 498,685, Folding handle bars for bicycles, filed August 14, 1943; Ser. No. 498,-684, Folding cranks for bicycles, filed August 14, 1943.

One of the objects of the invention is the provision of an improved joint for folding bicycle frames which is adapted to hold the parts of the frame with absolute rigidity when they are secured in the extended or operative position, and which is also adapted to be released with ease and readily moved to the folded position.

Another object of the invention is the provision of an improved folding bicycle frame, the parts of which are held in extended position with absolute rigidity, but which is adapted to be folded with a minimum amount of effort into a folded position where it occupies a minimum amount of space and where its projecting parts overlap each other.

Another object of the invention is the provision of an improved folding bicycle frame which is provided with a plurality of jointed sections adjacent its middle portion so that the front and rear wheels may be moved into a position adjacent each other and which is so arranged that they are held in this position by movable jointed members in readiness for quick movement to the operative position, where they may be secured with absolute rigidity.

Another object of the invention is the provision of an improved form of joint for folding bicycle frames, having a hinge to guide the folding movement, but in which all of the strain is removed from the hinge and taken by complementary interlocking joint members, which may be secured together with absolute rigidity in operative position.

Another object of the invention is the provision of an improved folding joint for bicycle frames which is adapted to be so arranged that the folding parts of the frame are suitable spaced from each other so that projecting parts, such as the axles, etc., do not interfere with each other in the folded position.

Other objects and advantages of the invention will be apparent from the following description and the accompanying drawings, in which similar characters of reference indicate similar parts throughout the several views.

Referring to the drawings, of which there are two sheets,

Fig. 1 is a side elevational view of a bicycle having a folding frame embodying the invention, with the bicycle frame in its extended or operative position;

Fig. 2 is a similar view of the bicycle, with its frame in one of the folded positions;

Fig. 3 is a top plan view of the bicycle, with its frame in extended position, showing the steering post in section and with the seat removed;

Fig. 4 is a top plan view under the same conditions, with the bicycle frame in its folded position;

Fig. 5 is a sectional view, taken on the plane of the line 5—5 of Fig. 6, looking in the direction of the arrows, showing the details of construction of the joint in the top tube or upper horizontal frame member of the bicycle;

Fig. 6 is a plan view in partial section, taken from the left of Fig. 5, showing the same joint;

Fig. 7 is a sectional view, taken on the plane of the line 7—7 of Fig. 6, looking in the direction of the arrows;

Fig. 8 is a fragmentary side elevational view of the joint of Fig. 6; and

Fig. 9 is a fragmentary elevational view, similar to Fig. 6, showing the construction of the joint in the lower frame member of the bicycle, which extends diagonally forward and upward.

Referring to Figs. 1 to 4, 10 indicates in its entirety the bicycle with a folding frame, which is provided with all of the conventional parts, the frame being indicated in its entirety by the numeral 11; 12 indicates the rear wheel, 13 the saddle, 14 the handle bars, 15 the front wheel, 16 the sprocket, 17 the cranks, 18 the pedals, 19 the chain, 20 the front steering post, 21 the front fork, 22 the saddle post, 23 the front shaft, and 24 the rear shaft.

I desire it to be understood that the present invention may be used in bicycles of various types of construction, and that shown in the drawings is merely exemplary of one of the types of construction which is chosen for illustrating the invention.

Bicycles embodying the present invention are preferably provided with a pair of joints, which may be indicated in their entirety by the numerals 25 for the top joint and 26 for the bottom joint. For the purpose of reference, that part of the frame at the left of the joints 25, 26 may be indicated by the numeral 27, and that part toward the right, or the front of the bicycle,
by the numeral 28.

In order to provide for the most compact folding of the bicycle frame and its parts, the joints 25, 26 are preferably located substantially midway between the front and rear axles and on a vertical line which is at right angles to a line extending from axle to axle and is equi-distant between the axles.

I desire it to be understood, however, that the exact position of these joints with reference to the two axles may be varied in some embodiments of the invention for the purpose of locating one axle slightly in advance of or beyond the other axle in the folded condition.

Each of the joints 25 and 26 is preferably provided with a hinge, indicated in its entirety by the numeral 25ª for the upper joint and 26ª for the lower joint, but these hinges preferably are not used except for the purpose of guiding the folding movement and for holding the parts in the folded position, as special arrangements are preferably made for securing the folding parts of the frame together with absolute rigidity in the extended or operative position without depending upon the hinges.

Referring to Figs. 5 to 8, these figures show the details of construction of the upper joint in the upper horizontal frame member or upper tube of the bicycle. This joint 25 may be used upon any existing bicycle by cutting out a section of the upper frame member 11 to provide space for the joint and by suitably reaming out the ends of the tube sections 29, 30 to receive the joint fixtures 31, 32. Thus, each tube may be formed with a slightly larger counterbore 33ª, terminating at an annular shoulder 33 for receiving the tubular portion 34 of the fixture 31 or 32.

In some embodiments of the invention this counterbore 32 and the external surface 35 of the tubular portion 34 may be tapered to fit.

The fixture 31 preferably comprises a forging which is provided with a tubular portion for securement to the tube section 29 and with an annular shoulder 36 for limiting the movement of the tubular portion 34 into the tube 29.

The fixture 31 is provided with a body portion 37 that may be substantially half cylindrical in shape and which is provided with the threaded through bore 38, the axis of which extends at right angles to the axis of the upper tube.

The threaded through bore 38 is adapted to receive the threaded portion 39 of the screw bolt 40, and the screw bolt 40 has its threaded portion of sufficient length so that it projects outward beyond the fixture 31 by a sufficient amount to permit the screw bolt to be in its bore, while the hinge is being moved upon its pintle.

At its lower end in Fig. 6 the threaded portion 39 of the screw bolt 40 is provided with a groove 41, which is half circular in cross section and adapted to receive the spring wire 42 that serves as a thrust bearing for definitely limiting the withdrawal of the bolt 40.

The spring wire 42 not only limits the outward movement of the bolt, but provides frictional engagement between this spring wire and the side of the fixture 31 so that the bolt is fixedly held in its withdrawn position, ready to permit the pivotal movement of the parts of the joint at all times, and so that the bolt does not get out of position for the reassembly or rejoining of the parts of the joint.

In addition to the body portion 37, the fixture 31 has the laterally projecting hinge arm 43, which may be in the form of a relatively thick flange provided at its outer edge with a plurality of cylindrical formations 44 serving as bearings for the pintle 45.

The pintle bearings 44 on the hinge arm 43 all have the aligned bores 46 for receiving the pintle 45. The pintle 45 may comprise a cylindrical member which is riveted or slightly headed at each of its ends so as to retain it in its bearings.

The bearing portions 44 of the hinge arm 43 are separated by grooves 47, which are rectangular in cross section and adapted to receive the bearing portions 48 of the other hinge arm 49, which is carried by the fixture 32. The bearing portions 48 are also provided with aligned bores 50 for receiving the pintle 45.

One side of the hinge pin or pintle holes 46 in the bearing portions 44 is preferably made slightly larger than the bores 50 in the other bearing sections 48, and larger bores 46 are preferably located slightly off center, leaving a clearance as indicated at 51 (Fig. 6) between the hinge pin 45 and the holes in the hinge arm 43 of the fixture 31, so that the hinge and hinge pin may accommodate themselves to wear that may take place between the interlocking teeth and grooves carried by the fixtures 31, 32, further to be described, and so that the actual tight engagement between these fixtures may be at such interlocking teeth and grooves without straining the hinge.

The hinge arm 43 preferably has its bearing portions 44 turned slightly toward the right in Fig. 6, away from the fixture 31, so that the pintle may be located in a plane beyond the end of the fixture 31, to permit the easy withdrawal of the fixture 32 from under the head 52 of the bolt 40.

The screw bolt 40 has its shank 53 passing through a slot 54 in the upper fixture 32 of Fig. 6, and is provided with a head 52, having a lower annular thrust surface 55 for engaging a plane thrust surface 56 surrounding the slot 54 on the fixture 32.

The head 52 of the bolt 40 may be cylindrical, and is provided with an axial bore 57 for receiving a helical compression spring 58 (Fig. 7). The head 52 is also provided with a transverse bore 59, which communicates with the bore 57 and is adapted to receive the handle pin 60 for a sliding fit in the bore 59.

The handle pin 60 is held in any adjusted position by frictional engagement with the walls of its bore 59 and with the spring 58, which presses against the handle pin 60. Each end of the handle pin 60 may be provided with a head 61, preventing its removal from the screw bolt 40.

The handle pin 60 is moved toward one side or the other of the bolt 40, whichever may be convenient to the operator to secure the desired leverage in clamping the parts together.

The fixture 32 carries the hinge arm 49, previously mentioned, which extends transversely to the top tube in such manner that the hinge pin 45 may be located in a vertical position, and hinge arm 49 carries the bearing portions 48, which are also separated by a rectangular slot and located to fit between the hinge portions 44 carried by the hinge arm 43.

In order to assure the firm securement of the fixtures 31, 32 in the operative position without placing strain in the hinge, these fixtures are preferably provided with the complementary teeth 62 and grooves 63 on the fixture 32 and the teeth 64 and grooves 65 on fixture 31.

These members are complementary in that the teeth on one fixture 31 fit into the grooves on the other fixture 32, except that these teeth and grooves are of substantially wedge shape and are of such size that there is a clearance at 66 at the base of each groove so that the sloping walls of the ridges are wedged into the grooves and firmly held in fixed position.

The teeth or ridges 62, 64 are preferably provided with the plane upper surface 67 at the top of each tooth or ridge so that the teeth may be of substantial thickness and the teeth and grooves extend longitudinally of the top tube member 11 and are parallel to each other.

Thus they are at right angles to the hinge pin 45 and adapted to be withdrawn from each other by pivotal movement when the parts of the joint 31, 32 are moved on the hinge pin 45.

The length of the screw bolt 40 is such that the thrust surface 55 under its head is adapted to clear the upper corner 32ª of the fixture 32 when this fixture pivots on the pintle 45. Of course, the shank of the bolt 40 passes out of the slot 54.

Referring now to Fig. 9, this is a view similar to Fig. 6 of the lower joint, which is similar in construction to that just described for the upper joint, with one exception. The parts of this lower joint have been indicated by the numerals 68, 69, and they are provided with similar hinge arms 70, 71, except that since the lower frame member 72 of the bicycle extends diagonally upward at an angle, the hinge plates 70, 71 are twisted at their outer ends to bring their bearing portions 73, 73ª into alignment with a pintle 74, which is located in the same axis as the axis of the upper pintle 45.

This common pivotal axis preferably extends vertically, but may be at some angle to the vertical, if it is desirable to cause such a folding of the frame that the handle bar 14 is located above the seat 13 or that one axle 23 is located above or below the other axle 24.

All of the other details of construction of fixtures 68, 69 may be substantially the same as that described with respect to Figs. 5 to 8 for the upper joint 25.

The view shown in Fig. 9 is taken on a plane located in the axis of the lower frame member 72; and therefore it shows the pintle 74 of this hinge at an angle to the tube.

It should be understood that the ridges or teeth 75 and grooves 76 on the fixture 68 and the complementary ridges or teeth 77 and grooves 78 on the fixture 69 extend parallel to each other so as to come into interlocking engagement, as previously described, and also extend at right angles to the axis of the pintle 74.

This causes the ridges or teeth and grooves to extend diagonally of the fixtures 68 and 69 so that their ends are visible in Fig. 9; but they are, nevertheless, in the same relation with respect to the hinge pintle so that they have sliding movement longitudinally of each other in the initial pivotal movement of one fixture relative to the other. The hinge pintles are, of course, both located on the same side of the frame 10, and both of the handle pins 60 are located on the opposite side, which also makes it more convenient for the operator to be in position to drive both of the screw bolts 40 home to secure the upper and lower joints in a minimum amount of time.

The operation of the folding bicycle frame is as follows: When the parts are in the extended or operative position, the teeth on the interlocking fixtures are secured in wedging engagement with the walls of the grooves on the opposite fixture by the clamping action of the screw bolts, and this removes all strain from the hinges and pintles and provides an absolutely rigid bicycle frame.

When it is desired to fold the bicycle frame, both the screw bolts 40 are withdrawn by means of their handle pins 60 by rotating the bolts in a counterclockwise direction until the spring wire 42 tightly and frictionally engages the wall of the adjacent fixture to hold the screw bolt in each case in its withdrawn position. Then the bicycle frame may be folded so that the front portion 28 folds over against the back portion 27. If, in this case, the fork 21 is kept turned forwardly of the frame portion 28 and the pintles are located exactly midway between the axles 23, 24, these axles would, of course, come into registry, and would engage each other, thus preventing the wheels from coming closer together.

In some embodiments of the invention this may be the arrangement, but it is also possible in many cases to turn the steering post 20 through an angle of 180 degrees, under which conditions the fork 21 would have its lower end extending toward the right, as shown in Fig. 2, so that the two axles would not be in registry, and they might be folded into a more compact position. This turning movement of the steering post 20 may not be possible when the handle bars are arranged in a lower position so that they interfere with the upper tube, or it may not be possible due to size and arrangement of the fork and front wheel.

The present folding bicycle frame is preferably employed with the folding handle bars and folding cranks covered by my copending applications, in which case the handle bars would extend downward on either side of the front frame portion 28 when it is in the folded position, and the pedals carried by the cranks would also extend toward each other when they are in the folded position. This also reduces the over-all width of the assembly measured at its projecting parts, such as the pedals and handle bars, and makes for a more compact folded condition.

The length of the hinge arms 43, 49 and 70, 71 is preferably such that when the frame portions 27, 28 are folded, as shown in Fig. 2, they are located in substantially parallel planes, but this may also be varied, provided, however, that the length of the hinge arms must in every case be such that the two pintles 74 and 45 are located on the same axis.

It will thus be observed that I have invented an improved folding frame for bicycles, the joints of which are adapted to be secured by manipulation of a single threaded member for each joint so that they are absolutely rigid when in the operative or extended position.

Practically all of the strain is removed from the hinges and pintles in this position, particularly in view of the fact that there is a clearance around the pintle with respect to the bearings on one of the fixtures, and this same clearance permits wear to be taken up and permits the tight wedging engagement between the interlocking teeth and grooves of the joints.

The present folding frame permits the bicycle to be folded into a minimum amount of space, reducing its length by half and locating the wheels within a space which does not increase the width over that of the projecting parts of the bicycle.

The present folding frame may be used with advantage upon many different types of bicycle, whether or not they employ the folding handle bars and folding cranks of my co-pending applications above-mentioned. In order to fold the bicycle into a minimum amount of space, however, it is necessary to utilize all of these folding features.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a folding tubular frame, the combination of a pair of tubular frame members with a pair of joint fixtures, each of said joint fixtures being arranged with an attaching portion adapted to be secured to the tubular parts of the frame, and said joint fixtures being formed with hinge flanges having a pintle, body portions on said fixtures for engagement with each other, and threaded means for clamping said body portions together and removing the strain from the hinge flanges and pintle when the body portions are clamped together, one of said body portions being formed with a slot and the other of said body portions being formed with a threaded bore for receiving said threaded means, whereby the fixtures may be pivoted to open position by merely withdrawing the threaded member to a predetermined degree, said body portions being provided with engaging surfaces having complementary grooves and ridges for effecting a rigid connection of said body portions when secured by said threaded member, said pintle having a clearance with respect to one of said hinge flanges to compensate for wear between said body portions.

2. A folding bicycle frame having its forwardly extending frame members each provided with a pair of hinge fixtures, said hinge fixtures each having a hinge flange provided with a pintle bearing, and the hinge flanges for each frame member being pivotally joined by a pintle, the said pintles being located laterally of the bicycle frame by a predetermined amount, and the pintles being located on the same axis, whereby the parts of the frame may be located in parallel relation when the hinges are open and the frame is folded, said fixtures being provided with inter-engaging wedge-shaped ribs and grooves; and threaded means for securing the hinge fixtures of each joint together in rigid position, with the ribs in tight wedging engagement with each other said threaded means being threaded in a bore in one of the fixtures and passing through a slot in the other of said fixtures, said threaded means being provided with a stop member for frictional engagement with the fixture when the threaded means is withdrawn to its limit of movement, whereby the threaded means may be frictionally held in that position.

3. A folding bicycle frame having its forwardly extending frame members each provided with a pair of hinge fixtures, said hinge fixtures each having a hinge flange provided with a pintle bearing, and the hinge flanges for each frame member being pivotally joined by a pintle, the said pintles being located laterally of the bicycle frame by a predetermined amount, and the pintles being located on the same axis, whereby the parts of the frame may be located in parallel relation when the hinges are open and the frame is folded, said fixtures being provided with inter-engaging wedge-shaped ribs and grooves; and threaded means for securing the hinge fixtures of each joint together in rigid position, with the ribs in tight wedging engagement with each other said threaded means being threaded in a bore in one of the fixtures and passnig through a slot in the other of said fixtures, said threaded means being provided with a stop member for frictional engagement with the fixture when the threaded means is withdrawn to its limit of movement, whereby the threaded means may be frictionally held in that position, and a sliding handle mounted in a bore in said threaded means and having spring means for engaging said handle and holding it in any of a plurality of predetermined positions.

4. In a folding tubular frame, a hinge structure for the frame comprising a pair of metal fixtures, each fixture having an attaching portion adapted to be secured to a tubular part of the frame, and each fixture being formed with a plurality of laterally projecting bearing flanges for a pintle, the bearing flanges on one fixture being spaced sufficiently to receive bearing flanges on the other fixture, and all of said bearing flanges having aligned bores, a pintle in said bores, said pintle having a predetermined clearance with respect to said bores to provide a loose connection, each of said fixtures being provided with a plurality of ribs and grooves extending longitudinally of the tubular members to which the fixtures are to be attached, said grooves and ribs being complementary on one fixture to the grooves and ribs on the other fixture, and means for securing the fixtures together and clamping the grooves and ribs into interlocking tight engagement with each other to hold the fixture in the unfolded position, the loose connection at the pintle and bearing flanges of the hinge permitting the grooves and ribs to seat against each other without restriction by the pintle.

5. In a folding tubular frame, a hinge structure for the frame comprising a pair of metal fixtures, each fixture having an attaching portion adapted to be secured to a tubular part of the frame, and each fixture being formed with a plurality of laterally projecting bearing flanges for a pintle, the bearing flanges on one fixture being spaced sufficiently to receive bearing flanges on the other fixture, and all of said bearing flanges having aligned bores, a pintle in said bores, said pintle having a predetermined clearance with respect to said bores to provide a loose connection, each of said fixtures being provided with a plurality of ribs and grooves extending longitudinally of the tubular members to which the fixtures are to be attached, said grooves and ribs being complementary on one fixture to the grooves and ribs on the other fixture, and means for securing the fixtures together and clamping the grooves and ribs into interlocking tight engagement with each other to hold the fixture in the unfolded position, the loose connection at the pintle and bearing flanges of the hinge permitting the grooves and ribs to seat against each other without restriction by the pintle, said means comprising a threaded member having a threaded end threaded in one of said fixtures, the other of said fixtures having a slot leading to a bore in the other fixture, and said threaded member having a head for clamping the fixtures together.

6. In a folding tubular frame, a hinge structure for the frame comprising a pair of metal fixtures, each fixture having an attaching portion adapted to be secured to a tubular part of the frame, and each fixture being formed with a plurality of laterally projecting bearing flanges for a pintle, the bearing flanges on one fixture being spaced sufficiently to receive bearing flanges on the other fixture, and all of said bearing flanges having aligned bores, a pintle in said bores, said pintle having a predetermined clearance with respect to said bores to provide a loose connection, each of said fixtures being provided with a plurality of ribs and grooves extending longitudinally of the tubular members to which the fixtures are to be attached, said grooves and ribs being complementary on one fixture to the grooves and ribs on the other fixture, and means for securing the fixtures together and clamping the grooves and ribs into interlocking tight engagement with each other to hold the fixture in the unfolded position, the loose connection at the pintle and bearing flanges of the hinge permitting the grooves and ribs to seat against each other without restriction by the pintle, said means comprising a threaded member having a threaded end threaded in one of said fixtures, the other of said fixtures having a slot leading to a bore in the other fixture, and said threaded member having a head for clamping the fixtures together, the threaded portion of said threaded member projecting from said fixture and being provided with a stop member for limiting the withdrawal of said threaded member to a position permitting the opening of said fixture.

7. In a folding tubular frame, a hinge structure for the frame comprising a pair of metal fixtures, each fixture having an attaching portion adapted to be secured to a tubular part of the frame, and each fixture being formed with a plurality of laterally projecting bearing flanges for a pintle, the bearing flanges on one fixture being spaced sufficiently to receive bearing flanges on the other fixture, and all of said bearing flanges having aligned bores, a pintle in said bores, said pintle having a predetermined clearance with respect to said bores to provide a loose connection, each of said fixtures being provided with a plurality of ribs and grooves extending longitudinally of the tubular members to which the fixtures are to be attached, said grooves and ribs being complementary on one fixture to the grooves and ribs on the other fixture, and means for securing the fixtures together and clamping the grooves and ribs into interlocking tight engagement with each other to hold the fixtures in the unfolded position, the loose connection at the pintle and bearing flanges of the hinge permitting the grooves and ribs to seat against each other without restriction by the pintle, the said grooves and ribs being tapered in cross section and formed with plane sides, the grooves being of narrower width than the ribs, whereby there is a reserved clearance at the head of each rib, to be taken up by the clamping means upon wear of the parts.

FRANK W. SCHWINN.